Jan. 21, 1975 M. BASCHE ET AL Re. 28,312
METHOD FOR PRODUCING BORON-CARBON FIBERS
Original Filed March 27, 1969
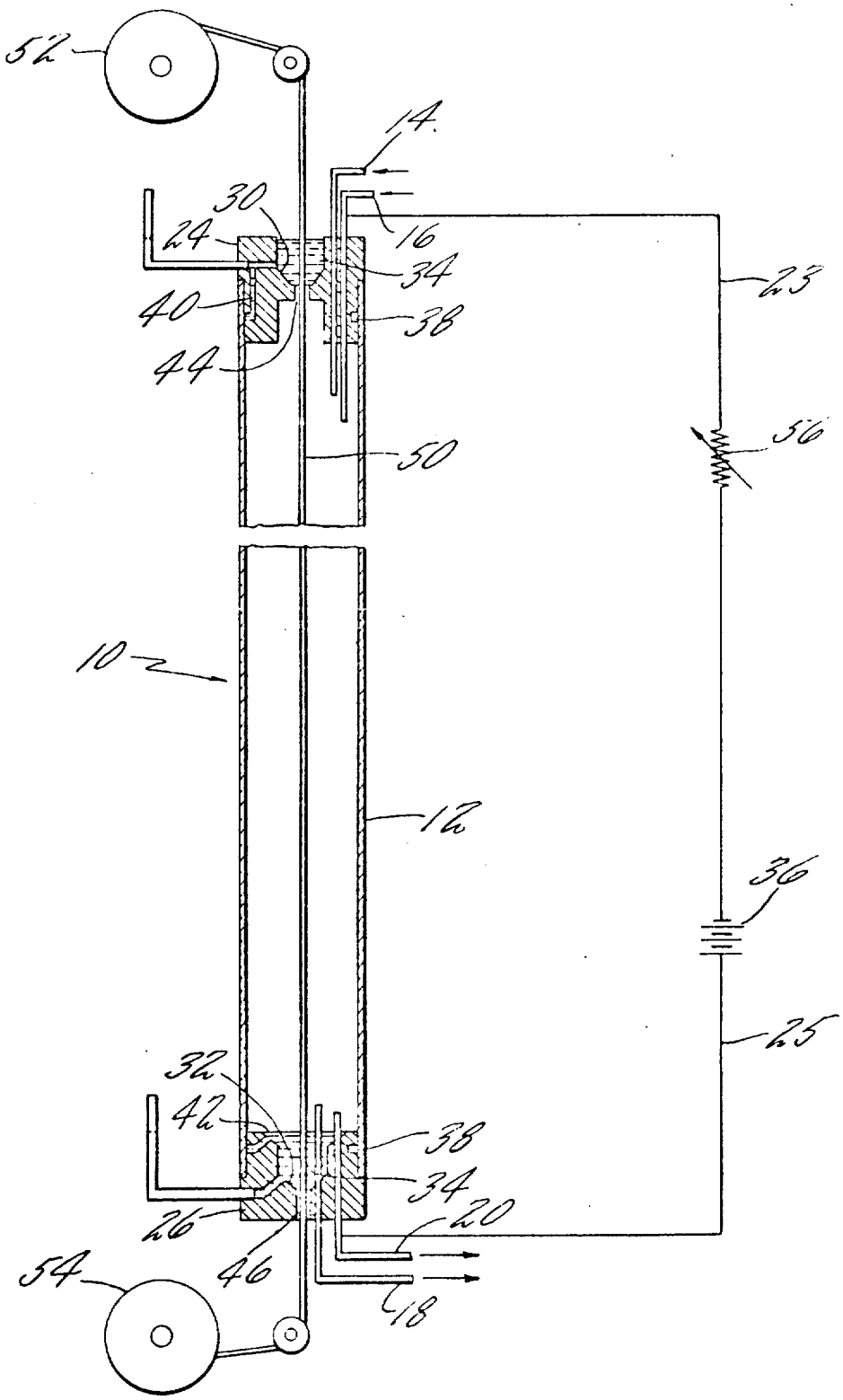

United States Patent Office

Re. 28,312
Reissued Jan. 21, 1975

28,312
METHOD FOR PRODUCING BORON-CARBON FIBERS

Malcolm Basche, West Hartford, Conn., Roy Fanti, Springfield, Mass., Francis S. Galasso, Manchester, and Urban E. Kuntz, East Hartford, Conn., and Richard D. Schile, Hanover, N.H., assignors to United Aircraft Corporation, East Hartford, Conn.

Original No. 3,679,475, dated July 25, 1972, Ser. No. 811,072, Mar. 27, 1969. Application for reissue Oct. 5, 1972, Ser. No. 295,393
Int. Cl. B44d *1/14, 1/18;* H01b *1/00*
U.S. Cl. 117—216 4 Claims

Matter enclosed in heavy brackets [ ] appears in the original patent but forms no part of this reissue specification; matter printed in italics indicates the additions made by reissue.

ABSTRACT OF THE DISCLOSURE

A chemical deposition process for producing continuous node-free filaments of boron over carbon by reducing a boron-containing gas, such as boron trichloride, on a resistively heated carbon substrate, the carbon substrate being pretreated with graphite to prevent the formation of hot spots during deposition.

BACKGROUND OF THE INVENTION

This invention relates generally to a method for producing boron fiber and more particularly relates to a method for continuously depositiong a relatively thick, substantially constant diameter boron coating on a carbon filament.

It is known that filamentary boron may be produced by pyrolytic techniques in a process wherein the boron is chemically deposited on a resistively heated carbon monofilament which is exposed to a reactant gas consisting of boron trichloride admixed with hydrogen.

The use of carbon as a filamentary substrate for boron has been recognized as offering the potential of significant improvements in the field of composite materials. Carbon, which in the present disclosure also includes graphitic material, possesses desirable characteristics in the form of electrical conductivity, hot strength, apparent chemical compatibility with boron, low density and an attractive cost feasibility relative to presently used tungsten filamentary substrates. Although the potential of carbon as a substrate is thus recognized, realization of this potential has been limited by the degradation of the carbon fiber during the coating process. It has been observed that, although the deposition of boron on the carbon substrate can be initiated uniformly, the coating quickly takes on a bamboo-like appearance with periodic nodes of boron thickened circumferentially along the fiber. The areas of increased deposition are caused by the appearance of a plurality of hot spots along the fiber and subsequent tests have revealed that the hot spots are caused by fractures in the carbon core which produce an irreversible change in the electrical properties of the fiber. It was found that the fractures occur irrespective of whether the process be static or continuous and with the fiber at a uniform temperature. Further investigations have indicated that the substrate fracturing is attributable to an unexpected growth phenomenon. As the boron is deposited on the carbon it undergoes a period of expansion which, when unchecked, exceeds the strength of the carbon filament, and causes fracturing thereof. The exact cause and nature of this phenomenon is imperfectly understood at this time.

Recently, several techniques have been developed to improve the effectiveness of the basic continuous process through the close control of process conditions. In one of these methods, a continuous coating of node-free amorphous boron is achieved by carefully limiting resident exposure of the carbon substrate in the reactor to a time period shorter than that at which fracturing occurs. At present however, the thickness of node-free boron which can be deposited on a one mil carbon filament by this technique is limited to a maximum of .6 mil to give a composite fiber of 2.2 mils.

SUMMARY OF THE INVENTION

The present invention relates to the production of relatively large, constant diameter composite fibers, approximating 4 mils, in an improved process wherein filamentary carbon is modified through pretreatment. The invention contemplates a process wherein a non-reactive structural barrier is provided between the carbon and the boron in the nature of an electrically conductive precoating of pyrolytic graphite. In one particular embodiment of the invention, the pyrolytic graphite is deposited in thin layers to provide for relative slippage, without fracture, between the inner carbon bonded layer and the outer boron bonded layer to prevent hot spotting and provide a technique wherein relatively thick node-free boron coatings are achieved in reproducible fashion.

BRIEF DESCRIPTION OF THE DRAWING

In the detailed description which follows, it will be convenient to make reference to the drawing which shows, in cross sectional view, an elevation of a reactor usable in the practice of the present invention.

DESCRIPTION OF THE PREFERRED EMBODIMENTS

Referring to the drawing, a reactor 10 is shown and described below. It is to be understood, however, that although a single reactor is shown which is suitable for both carbon and boron deposition, a plurality of such reactors are preferably disposed, in sequence, in the practice of the present invention. The reactor 10 comprises a tubular containment vessel 12 having dual gas inlets 14, 16 at the upper end and dual gas outlets or exhaust ports 18, 20 at the lower end thereof. During the deposition of pyrolytic graphite, the inlets 14 and 16 are utilized as a feed for a reactant gas mixture comprising a diluent gas, as for example the inert gas argon, and a carbon-containing gas such as methane. During the boron deposition, the inlets 14 and 16 are utilized as the feed for a reactant gas mixture comprising a boron halide and hydrogen. The containment vessel is typically formed of quartz or Pyrex, although a wide variety of other dielectrics and glasses are suitable. The gas inlet 16 and outlet 20 penetrate and are electrically connected to the metallic end plugs 24 and 26 which provide the end closures for the containment vessel and also, provide a convenient means through which the power may be supplied to the wire for resistance heating purposes.

The end plugs 24 and 26 are respectively formed to provide a well 30 and 32 for containing a conductive sealant 34, such as mercury. The mercury serves the dual purpose of providing a gas seal around the wire where it penetrates the end plugs and further providing electrical contact between the wire and the end plugs, through the gas tubes 20 and 26, the leads 23 and 25, and the DC power source 36. The end plugs are further provided with an annular surface groove 38, which communicates with the mercury well 34 in the plugs through passageways 40 and 42, to provide sealing between the plug and the abutting wall of the containment vessel whereby gas is prevented from escaping from the reactor around the periphery of the plugs.

The respective plugs are further each formed with centrally oriented orifices, 44 and 46, which are large enough to permit free passage of the wire therethrough but which, in combination with the wire, are small enough to retain the mercury, through surface tension forces, in the respective wells. The end plugs can be modified to include an orificed ruby, tungsten or other suitable insert through which the wire passes and which provides the sealant retainment function previously mentioned.

In the process of the present invention, a plurality of reactors 10 are serially disposed and a filamentary substrate 50 is drawn therethrough from a feed reel 52 to a take up reel 54 which maintain the wire under a slight tension as it passes through the orifice openings. Power from DC source 36 to the filament may be conveniently controlled by a resistor 56 although other means are suitable.

In carrying out the process wherein graphite is deposited on the carbon substrate in the reactor, conditions conventionally used for effecting pyrolytic deposition of graphite may be used. For example, the carbon filament substrate may be resistively heated to a temperature in the range of 1600° to 2100° C., preferably 1900° to 2000° C. Temperatures above 1600° C. are needed to insure the formation of graphite rather than pure carbon. The reaction may be carried out at a pressure of one atmosphere. A reactant gas which is introduced into the reactant chamber can be any carbon-containing gas suitable for depositing pure carbon in graphitic form. In particular, methane, in an amount 10 to 50 mol percent has given satisfactory results. The restricted concentration of methane in the reactant gas mixture is designed to prevent nodules from forming from too high a concentration and to prevent the formation of soot. The reactant gas mixture also includes a diluent gas such as nitrogen, hydrogen or one of the inert gases. Argon, in an amount of 50 to 90 mol percent has been particularly useful. A preferred ratio in the reactant gas mixture is 20 mol percent methane and 80 mol percent argon. Similarly, those conditions suitable for effecting pyrolytic boron deposition may also be used. For example, the graphite-coated carbon substrate may be resistively heated to a temperature in the range of 700 to 1400° C., preferably 1100° to 1300° C. The reaction may be carried out at a pressure of one atmosphere and the reactant gases may contain a boron containing gas (e.g. boron trichloride) in an amount of 15 to 75 mol percent and a reducing gas, preferably hydrogen, in an amount 85 to 25 mol percent. A preferred ratio of gases is 40% boron trichloride and 60 mol percent hydrogen.

During one investigation, a one mil carbon monofilament, from Great Lakes Carbon Corporation, having a clean surface substantially free of imperfection, a circular cross section and an electrical resistance between 500 to 2500 ohms per inch, was coated with two layers of pyrolytic graphite prior to boron deposition. The monofilament was passed through two reactors such as described above, each having an effective length of 3⅝ inches. In each reactor, the argon was provided at 800 cc./min. and the $CH_4$ at 200 cc./min. with a wire speed of 150 ft./hr. A substantially constant current of 145 ma gave a substrate temperature of 1900° C. The original diameter of the filament was 1.05 mil and, after the first pyrographite coating, the diameter was 1.16 mils. After the second pyrographite coating, the diameter was 1.3 mils.

The pyrolytic graphite coated fiber was then passed through a boron reactor. The first boron layer was achieved with boron trichloride feed of 400 cc./min. and a hydrogen feed of 600 cc./min. with a fiber speed of 400 ft./hr. through the 3⅝ inch reactor. The fiber temperature was approximately 1200° C. and the diameter measured 2.11 mils. The second boron layer was accomplished with a boron trichloride feed of 400 cc./min. and a hydrogen feed of 600 cc./min. with a fiber speed of 150 ft./hr. The fiber temperature was 1170° C. during deposition and the diameter measured 2.9 mils. The third boron layer was achieved with a $BCl_3$ feed of 400 cc./min. and a hydrogen feed of 600 cc./min. with a fiber speed of 150 ft./hr. The fiber temperature during this pass was maintained at about 1200° C. There were no hot spots and no breakage of the carbon monofilament and the diameter of the final composite filament was smooth and uniform and measured 3.73 mils constant within ± .0003 inch.

By way of comparison, a boron-carbon fiber was produced without pyrographite precoatings on the carbon. A one mil carbon monofilament was run through the reactor at a speed of 230 ft./hr. and at a temperature of 1170° C. with a $BCl_3$ feed of 400 cc./min. and an $H_2$ feed of 600 cc./min. The resulting composite exhibited the undesirable bamboo structure as previously discussed. The fiber had an average diameter of 3 mils with nodes as large as 4 mils in diameter which were spaced 7 to 10 mils apart.

What has been set forth above is intended primarily as exemplary to enable those skilled in the art in the practice of the invention and it should therefore be understood that, within the scope of the appended claims, the invention may be practiced in other ways than as specifically described.

What is claimed is:

1 A method for continuously depositing node-free amorphour boron to uniform thicknesses greater than 0.6 mil on a moving resistively heated carbon wire as it is drawn through a series of reactors comprising the steps of:

maintaining the carbon wire in the first reactor at a temperature of 1600°–2100° C.;

exposing the carbon wire while at said temperature in at least one reactor to a gaseous stream consisting essentially of a carbon-containing gas admixed with a diluent gas to effect deposition of pyrolytic graphite on the carbon wire;

maintaining the graphite-coated carbon wire in a subsequent reactor at a temperature of 700°–1400° C., and exposing the wire in said subsequent reactor to a gaseous stream of a boron halide admixed with hydrogen to effect deposition of elemental boron thereon;

said deposit of pyrolytic graphite being disposed to prevent fracture of the carbon wire by the boron.

2 The method of claim 1 wherein said carbon-containing gas is methane and said diluent gas is argon, said argon being present in an amount of 50–90 mol percent.

3 The invention of claim 1 wherein the pyrolytic graphite coating is deposited in at least two layers.

*4 A method for continuously depositing node-free amorphous boron to uniform thicknesses greater than 0.6 mil on a moving resistively heated carbon wire as it is drawn through a series of reactors comprising the steps of:*

*maintaining the carbon wire in the first reactor at a temperature sufficient to effect deposition of pyrolytic graphite thereon, said temperature being above 1600° C.;*

*exposing the carbon wire while at said temperature in at least one reactor to a gaseous stream consisting essentially of a carbon-containing gas admixed with a diluent gas to effect deposition of pyrolytic graphite on the carbon wire;*

*maintaining the graphite-coated carbon wire in a subsequent reactor at a temperature of 700°–1400° C.,*

*exposing the wire in said subsequent reactor to a gaseous stream of a boron halide admixed with hydrogen to effect deposition of elemental boron thereon, and*

*said deposit of pyrolytic graphite being disposed to prevent fracture of the carbon wire by the boron.*

References Cited

The following references, cited by the Examiner, are of record in the patented file of this patent or the original patent

UNITED STATES PATENTS

| | | | |
|---|---|---|---|
| 2,767,289 | 10/1956 | Robinson | 117—DIG. 10 |
| 3,226,248 | 12/1965 | Talley | 117—DIG. 10 |
| 3,367,826 | 2/1968 | Heestand et al. | 117—46 C.G |
| 3,369,920 | 2/1968 | Bourdeau | 117—46 C.G |
| 3,464,843 | 9/1969 | Basche | 117—46 C.G |
| 3,479,205 | 11/1969 | Morelock | 117—46 C.G |
| 3,531,249 | 9/1970 | Turkat | 117—46 C.G |
| 3,565,683 | 2/1971 | Morelock | 117—DIG. 10 |

MICHAEL SOFOCLEOUS, Primary Examiner

U.S. Cl. X.R.

117—46 C.G., 69, 93, 106 R, DIG. 10; 423—447